United States Patent [19]

Stalcup et al.

[11] 4,357,286

[45] Nov. 2, 1982

[54] METHOD OF MAKING A GRAPHITE-GLASS COMPOSITE LASER MIRROR

[75] Inventors: Robert K. Stalcup, Lake Park, Fla.; Karl M. Prewo, Vernon, Conn.

[73] Assignee: United Technologies Corporation, Hartford, Conn.

[21] Appl. No.: 206,911

[22] Filed: Nov. 5, 1980

[51] Int. Cl.$^3$ .............................................. B29D 11/00
[52] U.S. Cl. ...................................... 264/1.2; 65/18.1; 65/18.3; 264/1.9; 264/332; 350/288; 350/310
[58] Field of Search .................... 264/1.2, 1.9, 332; 65/18.1, 18.3; 350/288, 310

[56] References Cited

U.S. PATENT DOCUMENTS

| | | | |
|---|---|---|---|
| 3,131,238 | 4/1964 | Carnall, Jr. et al. | 264/1.2 |
| 3,311,522 | 3/1967 | Ladd et al. | 156/306 |
| 3,645,608 | 2/1972 | Staley et al. | 350/310 |
| 3,766,000 | 10/1973 | Gibson et al. | 264/332 |
| 4,268,562 | 5/1981 | Bacon et al. | 264/332 |

FOREIGN PATENT DOCUMENTS

| | | | |
|---|---|---|---|
| 1062401 | 7/1959 | Fed. Rep. of Germany | 65/18.3 |
| 2215631 | 8/1974 | France | 350/310 |

*Primary Examiner*—James B. Lowe
*Attorney, Agent, or Firm*—Harry J. Gwinnell

[57] ABSTRACT

A laser mirror stable at high and low temperatures is described comprising graphite fibers in a glass matrix. The mirror is made by hot pressing a graphite fiber lay-up in a glass matrix in a die having a highly polished mirror replicating surface, the fibers laid up in such a way to produce a central plane of symmetry across the central plane of the composite. In use, the composite requires a separate laser reflecting surface layer. The resulting laser mirror has a low density but no porosity, high elastic stiffness, high strength, high fracture toughness, low thermal expansion, high thermal conductivity and environmental stability.

6 Claims, 4 Drawing Figures

METHOD OF MAKING A GRAPHITE-GLASS COMPOSITE LASER MIRROR

CROSS REFERENCE TO RELATED APPLICATION

Commonly assigned, copending application Ser. No. 54,098, filed July 2, 1979, now U.S. Pat. No. 4,256,378 is directed to a graphite-glass composite laser mirror.

TECHNICAL FIELD

The field of art to which this invention pertains is molding methods, and specifically methods of molding composite optical elements of the reflecting type.

BACKGROUND ART

While there is a myriad of art covering laser mirrors (e.g., U.S. Pat. Nos. 3,836,236; 3,926,510; and 3,942,880) because of the many peculiar physical property requirements of such mirrors in this environment, a variety of materials, designs and forming methods have been employed in attempts to optimize the particular properties necessary for a composite used in this particular environment. For example, a laser mirror in this environment must not only have the requisite reflective properties but should be a relatively simple structure to permit rapid fabrication, both for time and cost purposes. Such mirrors should also desirably have low density for ease of use in the types of apparatus where they will be used. Furthermore, such mirrors ideally should have high elastic stiffness and high strength along with high fracture toughness. And stability is of the utmost importance both from the point of view of the fine resolution-type work environment the mirrors will be used in, and the inaccessibility of the apparatus which these mirrors would be used in, for example, outer space applications. These stability properties include low thermal expansion, high thermal conductivity, and environmental stability. Environmental stability includes such things as dimensional stability and mirror integrity regardless of moisture conditions, vacuum conditions, or ultraviolet light exposure, and mirror integrity and dimensional stability at both high and low temperatures. Currently, laser mirrors are basically either highly polished metal blocks formed by highly labor intensive polishing processes (high energy laser application), or graphite reinforced resin matrix composites or low expansion glasses (low energy laser application). However, because such currently used composites and glasses fall off in one or more of the above-cited property areas, it is generally necessary to include a myriad of complicated designs and manufacturing procedures to compensate for property defects in the particular areas under consideration. Note for example, the complicated coolant designs in the above-cited references. Furthermore, the popular use of resins in conventional composites of the above type inherently suffer from dimensional changes due to absorption or desorption of moisture, evolution of organic constituents due to prolonged exposure to high vacuum, breakdown due to prolonged exposure to ultraviolet radiation, low thermal conductivity, high coefficients of thermal expansion, and rapid decrease in integrity when used above 300° C.

DISCLOSURE OF INVENTION

The present invention is directed to a method of eliminating or at least reducing the highly labor intensive optical surface polishing steps required in the formation of a laser mirror by utilizing a graphite fiber-glass matrix for mirror formation in a process utilizing a highly polished mirror replicating surface die. The improved process according to the present invention comprises hot pressing a lay-up of the graphite fiber and particulate glass matrix against the highly polished die surface to thereby form the extremely smooth optical surface required of a laser mirror during pressing, thereby reducing the highly labor intensive surface polishing steps generally required in the processing of such articles. To help insure the smoothness of the optical surface, a glass rich layer is utilized at the polished die surface during composite lay-up.

Both the graphite fibers and the glass matrix are selected and matched to provide, after hot pressing in the mold, a laser mirror of low density, high elastic stiffness, high strength, high fracture toughness, low thermal expansion, high thermal conductivity and environmental stability. The graphite fibers must have high strength and good modulus of elasticity. The glass matrix must have a low coefficient of thermal expansion matched closely to that of the graphite fiber. The hot pressed composite itself made according to the present invention, provides the reflecting surface shape to which is applied a laser radiation reflecting surface layer. The thermal expansion characteristics, thermal conductivity and composite strength and fracture toughness of such composite resulting from the selection of such materials processed as described is far superior to any similar articles currently in use, which is quite surprising from the relatively brittle nature of the two starting materials.

The foregoing, and other features and advantages of the present invention, will become more apparent from the following description and accompanying drawing.

BEST MODE FOR CARRYING OUT THE INVENTION

While any graphite fiber with the requisite high strength and good modulus of elasticity can be used in the laser mirrors of this invention, such as Hercules HMS graphite fiber, Celanese GY-70 (formerly DG102) graphite fibers are particularly suitable. This fiber consists of 384 fibers/tow and has an oxidized finish. It is 8 microns in diameter, has a modulus of elasticity of 531 GPa ($77(10)^6$ psi). It has a tensile strength of 1724 MPa (250 ksi) and a density of 1.96 gm/cm$^3$. The fiber is used at about 40 to 70% by volume based on the graphite-glass composite and preferably at about 60% by volume.

The glass used was particularly selected to have a very low coefficient of thermal expansion preferably matched closely, but not equal to that of the graphite fibers used since the graphite has a highly negative axial coefficient of thermal expansion and the glass has a positive but small coefficient of thermal expansion. Particularly suitable for the purposes of this invention is a borosilicate glass (CGW 7740) with an anneal point of 500° C., a softening point of 821° C., a liquidus temperature of 1017° C., a density of 2.23 grams per cubic centimeter an index of refraction of 1.474, a dielectric constant of 4.6, a coefficient of linear expansion of 32.5 cm/cm°C.$\times 10^{-7}$ and a modulus of elasticity of $6.40 \times 10^9$ kgs per square meter ($9.1 \times 10^6$ psi). The particle size of the glass should be such that at least 90% passes through a 36.0 mesh screen.

The preferred method for making the mirrors according to the present invention comprises continuously unwinding a tow of graphite fibers from a spool at a moderate rate of speed and passing such fibers through a slip of powdered glass, solvent and plasticizer to impregnate the tow. The impregnated fibers are then rewound onto a larger rotating spool. An exemplary slip composition may be composed of 250 grams of powdered glass in 780 ml of propanol. An alternative composition may comprise 85 grams of the glass and 200 grams of propanol, 10 grams of polyvinyl alcohol and 5 drops (approx. 1 cc) of a wetting agent, Tergitol ®. The receiving drum is preferably run at 1 revolution per minute or linear speed of 1.52 meters per minute (5 feet per minute). Excess glass and solvent can be removed by pressing a squeegy against the drum as it winds. Preferably the ground glass is sized so that 90% of it passes through a $-325$ mesh sieve. The thus impregnated tape is then dried either at ambient temperature or with a radiant heating source to remove solvent.

Figure 1:
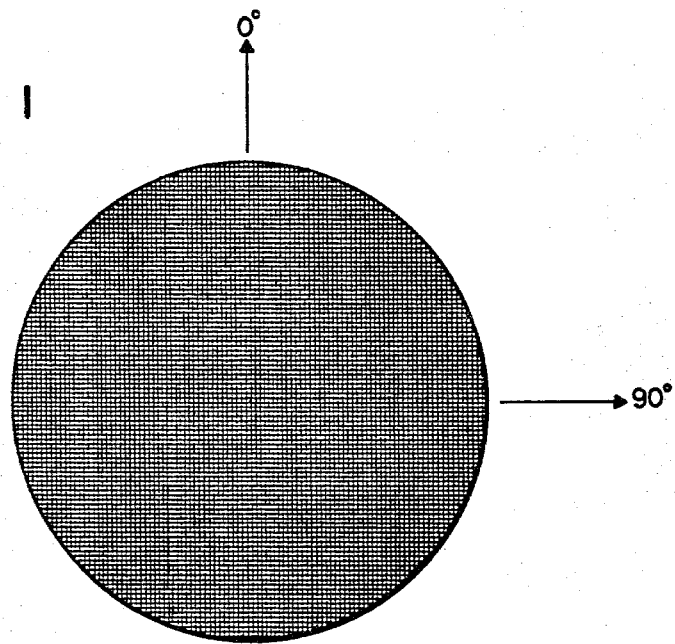
FIG. 1 demonstrates a typical 0° and 90° cross-ply graphite fiber lay-up for the mirrors of the present invention.
Figure 2:
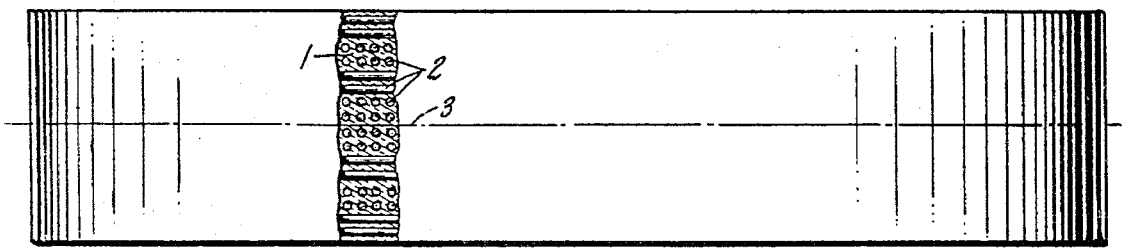
FIG. 2 demonstrates an end view of a finished mirror of the present invention.

Following the impregnation the fiber is removed from the drum and cut into strips up to the diameter of the mirror to be fabricated. While the typical test samples made were about 10 cm in diameter, mirrors up to 20 cm in diameter have also been made by the processes of the present invention. However, mirrors of even larger diameters can be made according to the present invention. The fibers are then preferably laid in alternating ply stack-up sequence of 0° and 90° as illustrated by FIGS. 1 and 2. The assembled composite is then hot pressed, either under vacuum or inert gas such as argon in the special optical surface dies according to the present invention. Such dies are more clearly described with reference to FIG. 4, where the sidewall portions (11) and spacer (12) are preferably graphite, spacer 17 can be graphite or molybdenum, and the molybdenum die is indicated as 13 having a highly polished optical replicating surface 14. The graphite-glass composite material is shown as 15 under compressive load 16 as indicated by the arrows.

While the molybdenum is the preferred material of the polished optical replicating surface because of its ability to take a high polish and maintain this polish for at least several mirror moldings under the high temperature and pressure conditions used in the present process, any other material with these properties may also be used such as tungsten, or molybdenum alloys with tantallum and zirconium (TZM).

Figure 4:
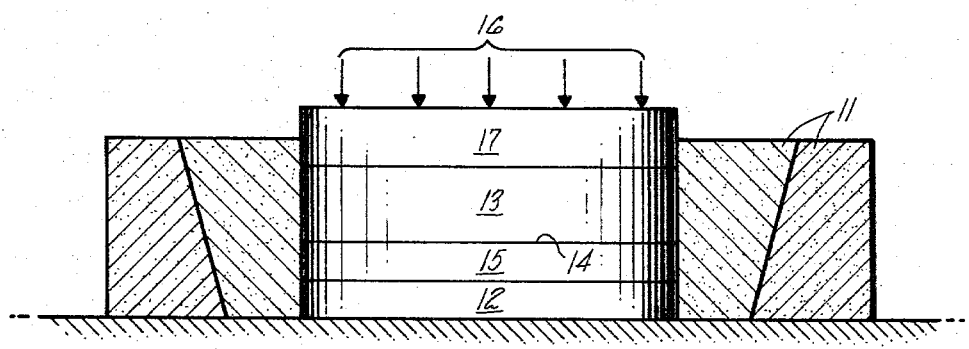
FIG. 4 demonstrates typical apparatus useful for performing the method according to the present invention.

While the apparatus and method demonstrated in FIG. 4 is shown for a relatively flat mirror surface, the replicating surface 14 can also be made to impart a curved surface to the laser mirror during the molding stage. And the curvature referred to can be concave, or convex, spherical, cylindrical, or compound and can have that radius of curvature typical in this art, e.g. about 2 to about 40 meters. Not only is this a significant time saver in eliminating or at least lessening subsequent grinding and polishing, but allows for much more accurate duplication of surface pattern than other methods in this art. In this regard, attention is directed to U.S. Pat. No. 3,824,301, which while not directed to laser mirrors or graphite-glass composites does mention the use of molybdenum dies as part of the molding apparatus. However, this reference is typical of the state of the art in its recitation of mold parting agents, optical polishing, and no recognition of the advantages the use of a highly polished molybdenum die surface can provide in a laser mirror molding process.

Typical hot press conditions for forming the mirrors according to the present invention are pressures of 6.9 to 13.8 MPa (1000–2000 psi) and temperatures of 1050°–1450° C. Additional glass in the form of powder may also be inserted between each layer as it is laid in an attempt to achieve a preferred 40–70% by volume loading of graphite fiber in the composite. Also, the mold can be vibrated to insure uniform distribution of the glass over the laid fiber surfaces.

It is important for obtaining the above-cited mirror properties that a central plane of symmetry be maintained across the central plane of the graphite glass composite. Thus, while alternating 0° and 90° fiber laying was the most common test sample arrangement used, 0° and 45°; 0°, 45° and 90°; 0°, 30° and 90°; 0° and 60°, etc., fiber laying can also be used as long as a central plane of symmetry is maintained. In fact, the 0°, 45° and 90° and 0° and 60° fiber laying give additional advantage of isotropy of elastic stiffness. By central plane of symmetry is meant that if the composite is sliced in half parallel to what will be the reflecting surface and perpendicular to the mirror's focal axis, each half will be a mirror image of the other half. Such symmetry especially affects the warpage characteristics of the composite. In addition, it is preferred that the ply lay-up sequence be balanced. By balanced it is meant that there are equal numbers of composite plies, and hence fibers, directed in each of the principal fiber directions chosen. Such balance affects the strength and modulus properties of the composite. This is specifically demonstrated by FIG. 2 which is the end view of a 0° and 90° specimen where 1 indicates the glass matrix, 2 indicates the graphite fibers and 3 indicates the central plane of symmetry.

Figure 3:
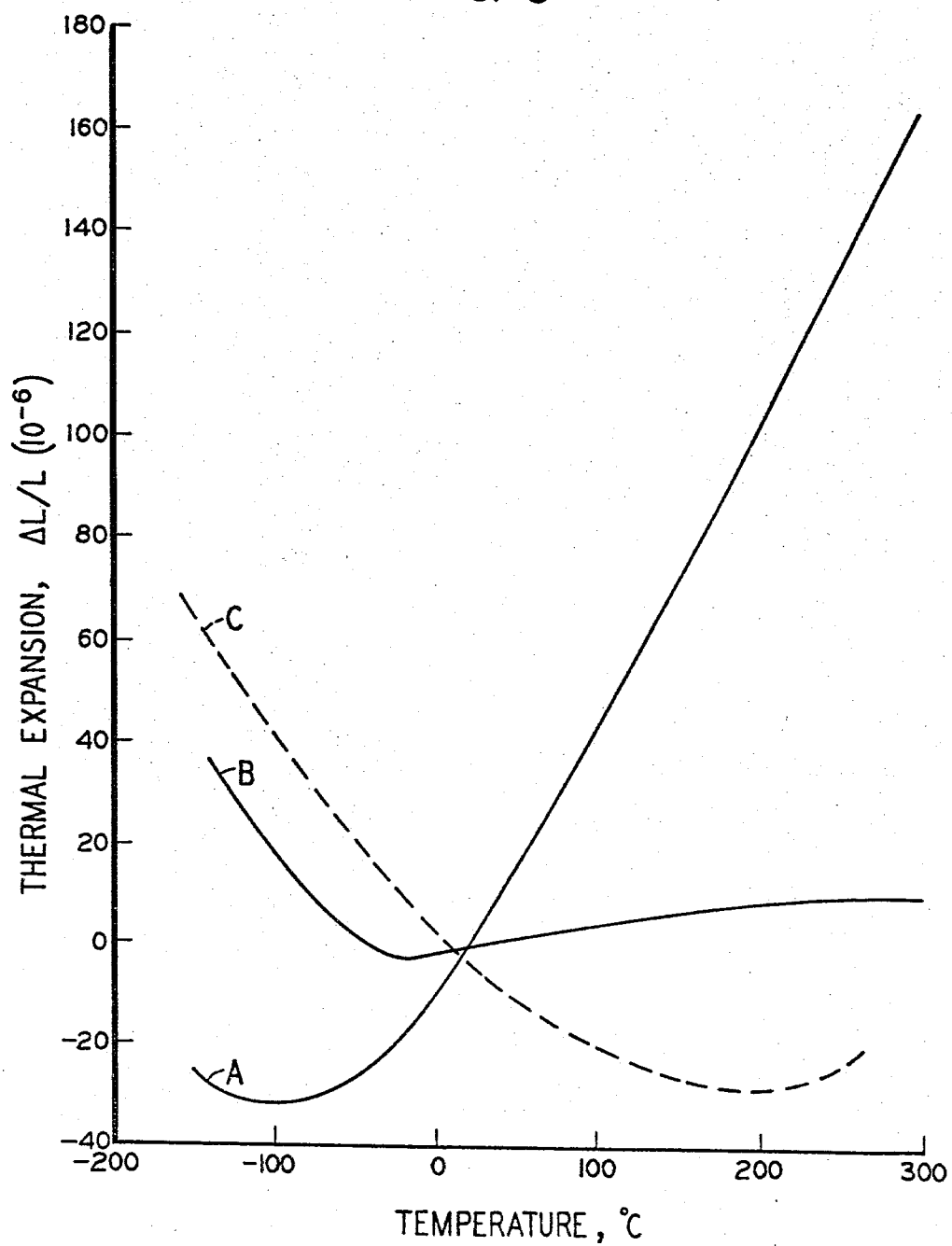
FIG. 3 demonstrates graphically thermal expansion characteristics of mirrors of the present invention.

As can be seen from FIG. 3, the thermal expansion characteristics of a 0° and 90° graphite-glass lay-up are on a par with other conventional materials known for their dimensional stability. Curve A represents unreinforced fused silica (N.B.S. reference number 739 measurement). Reference B represents unreinforced ULE glass (Corning Code 7971 measurement). And Reference C represents the 0° and 90° graphite-glass of the present invention. Because of its superiority in other properties of strength, stiffness, thermal conductivity, and toughness, the graphite reinforced glass is the overall superior material.

It is necessary to provide the mirror composite with a separate laser reflecting surface such as are conventionally used in the laser mirror art (e.g., a chromium-gold alloy). Such surface layers can be applied by conventional methods commonly used to deposit thin uniform layers (e.g., less than 1 mil) of such material such as vapor deposition and cathode sputtering.

As stated above, the process and materials of the present invention provide ease of rapid fabrication, low density, high elastic stiffness, high strength, high fracture toughness, low thermal expansion, high thermal conductivity and environmental stability. Most important of these characteristics are the thermal expansion, thermal conductivity, and composite strength and fracture toughness. Note also Table I for a comparison of coefficients of thermal expansion for composites of various matrices.

TABLE I

| Fiber | Matrix | 0° CTE (10⁻⁶/°C.) | 90° CTE (10⁻⁶/°C.) | Temperature (°C.) |
|---|---|---|---|---|
| 50% Hercules HMS | 7740 Pyrex Glass | −0.51 | 4.5 | 27 |
| 50% Hercules HMS | 7740 Pyrex Glass | −0.62 | 4.5 | −125 |
| 50% Hercules HMS | Epoxy | −0.18 | 37.4 | 24 to +180 |
| 50% Hercules HMS | Epoxy | −0.56 | 24.3 | 24 to −200 |
| Hercules HMS | Polyimide | −0.306 | — | 22 |

The thermal conductivity of a laser mirror composite formed according to the present invention is also high. For example, the thermal conductivity through a plane of a two-dimensional composite is clearly better than conventional epoxies and nearly twice that for the same composite using a conventional polyimide matrix rather than a glass matrix. Attention is directed to Table II for comparison of the superior thermal conductivity of the glass composite of the present invention as compared to that of resin matrix composites.

TABLE II

| Material | Orientation | Thermal Conductivity (cal/sec-cm-°C.) |
|---|---|---|
| HMS Fiber (0/90)- 7740 Glass | ⊥ | 0.0053 |
|  | ‖ | 0.0700 |
| HMS Fiber (0/90)- Polyimide Resin | ⊥ | 0.0032 |
|  | ‖ | 0.0207 |

In Table II, the measurements were taken in planes normal and parallel to the fibers and the conductivity was measured through the composite. ⊥ refers to the measurements made in a direction normal to the plane of the fibers and // refers to the measurements made in a direction parallel to the plane of the fibers.

Because of the low temperature environment which high performance laser mirrors may be used in (e.g. outer space applications), testing was performed at 150 K and 300 K to demonstrate the composite strength and fracture toughness of the laser mirror under such adverse temperature conditions. In all cases, the mirrors were able to withstand high loads with increasing strain after initial fracture, and in all cases the mirrors remained substantially intact at the conclusion of testing. Attention is directed to Table III for demonstration of the superior strength and toughness of the mirror composites of the present invention.

And as far as high temperature applications of the mirrors of the present invention, the only limitation would be the upper limits of the reflective layers which are applied. Currently, most protective coatings have an upper limit of about 300° C. before they begin to release from the surface. However, because of the high temperature stability of the composites of the present invention, reflective layers with temperature limits greater than this could also be used, resulting in a coated mirror with higher use temperature than currently used.

Presently, the two most popular materials for laser mirror use are molybdenum substrates with intricate cooling passages and gold or silver coated ULE glass. However, the composites of the present invention are far superior to either of these commercially known materials. The mirrors of the present invention have a thermal conductivity sufficient for high flux loads, a low thermal expansion, are low density and lightweight.

TABLE III

Three Point Flexural Strength of Unnotched 0/90 Cross Ply Reinforced Glass

| Specimen Number | Test Temperature K | Flatwise Flexural Strength | |
|---|---|---|---|
| | | MPa | 10³ psi |
| 1 | 300 | 294 | 42.6 |
| 2 | 300 | 316 | 45.9 |
| 3 | 300 | 367 | 53.3 |
| 4 | 300 | 301 | 43.6 |
| 5* | 300 | 259 | 37.5 |
| 6* | 300 | 331 | 48.0 |
| | Average | 311 | 45.5 |
| 7 | 150 | 192 | 27.8 |
| 8 | 150 | 354 | 51.3 |
| 9 | 150 | 214 | 31.1 |
| 10 | 150 | 485 | 70.3 |
| | Average | 311 | 45.1 |

*Specimens 5 and 6 were tested with machined surface in tension while all others had the as-fabricated surface in tension.

Such properties provide low distortion with increased flux, minimum coolant system requirements, and superior optical component durability. Such properties can result in mirrors fabricated with a thermal expansion only 3% that of molybdenum, with a lightweight density less than aluminum, and a cost only 10%, for example, of conventional molybdenum mirrors. Furthermore, the mirrors of the present invention can be made with a 90% reduction in distortion, 60% reduction in coolant supply, and 90% reduction in weight over conventionally used molybdenum mirrors.

It should also be noted that while this disclosure is specifically directed to laser mirrors, it would be within the purview of one skilled in this art to use the mirrors of the present invention to reflect other wavelengths of radiation such as optical light.

It is quite surprising that two brittle materials such as graphite and glass can produce in combination such a fracture tough, dimensionally stable mirror. For example, all glass mirrors have to be cooled slowly to avoid cracking. However, with the present invention the mirrors have such a high degree of fracture toughness that such slow cooling is not necessary. Furthermore, because of the high thermal conductivity of such mirrors, cooling takes place not only much more uniformly, but much more quickly as well. And the dimensional stability of such mirrors is such that they are particularly suitable for close tolerance work. For example, a 5.1 cm wide (2 in.), 5.1 cm thick (2 in.) mirror made according to the present invention would change only 0.05 mil in width and only 1 mil in thickness over a 100° C. change in temperature. And the high fracture toughness allows machining to almost any design. The presence of the fibers inhibits microcrack formation during machining and during use.

Although this invention has been shown and described with respect to detailed embodiments thereof, it will be understood by those skilled in the art that various changes in form and detail thereof may be made without departing from the spirit and scope of the claimed invention.

We claim:

1. A method of making a laser mirror comprising laying up alternating ply stacks of graphite fibers and particulate glass in a pressing mold having a highly polished mirror replicating surface, said laying being glass-rich against the replicating surface, hot pressing the graphite-glass in the mold to form a laser mirror composite having a mirror surface requiring little or no surface polishing, and applying a laser radiation reflecting layer to the mirror surface.

2. The method of claim 1 wherein the replicating surface is a flat surface.

3. The method of claim 1 wherein the replicating surface is a curved surface.

4. The process of claim 1 wherein the mirror contains 40% to 70% by volume graphite fibers having an orientation in the composite of 0° and 90°; 0°, 45° and 90° or 0° and 60°.

5. The process of claim 1 wherein the glass comprises borosilicate.

6. The process of claim 1 wherein the graphite fibers have a modulus of elasticity of at least 531 GPa, a tensile strength of at least 1724 MPa and a density of about 1.96 gm/cm$^3$.

* * * * *